United States Patent
Li et al.

(10) Patent No.: US 9,641,396 B2
(45) Date of Patent: May 2, 2017

(54) PACKET PROCESSING METHOD AND SYSTEM

(71) Applicant: Huawei Technologies Co., Ltd., Shenzhen (CN)

(72) Inventors: Ke Li, Beijing (CN); Jincai Su, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 618 days.

(21) Appl. No.: 14/180,087

(22) Filed: Feb. 13, 2014

(65) Prior Publication Data

US 2014/0169155 A1 Jun. 19, 2014

Related U.S. Application Data

(63) Continuation of application No. PCT/CN2011/078478, filed on Aug. 16, 2011.

(51) Int. Cl.
*H04L 12/24* (2006.01)
*H04L 12/42* (2006.01)
(Continued)

(52) U.S. Cl.
CPC ........... *H04L 41/12* (2013.01); *H04L 12/42* (2013.01); *H04L 12/437* (2013.01); *H04L 12/4675* (2013.01); *H04L 43/0811* (2013.01); *H04L 45/02* (2013.01)

(58) Field of Classification Search
None
See application file for complete search history.

(56) References Cited

U.S. PATENT DOCUMENTS 8,126,470 B2 * 2/2012 Zheng .............. H04L 45/26
370/315
2008/0181219 A1 7/2008 Chen et al.
(Continued)

FOREIGN PATENT DOCUMENTS

CN 101013992 A 8/2007
CN 101610193 A 12/2009
(Continued)

OTHER PUBLICATIONS

Chinese Office Action, Application No. 201180001745.4, date Sep. 25, 2014, 5 pages.
(Continued)

*Primary Examiner* — Hong Cho
(74) *Attorney, Agent, or Firm* — Kilpatrick Townsend & Stockton LLP (57) ABSTRACT

Embodiments of the present invention disclose a packet processing method and system. In the method in the embodiment of the present invention, because a root node configures different control VLANs for any two rings that have an adjacent edge in an area, different control VLANs are used to transmit a protocol packet in a ring that has its own control VLAN configured. The method and system may be applied to a ring network of a metro Ethernet to provide multi-path protection and implement rapid convergence of service switchover. In addition, a network topology structure is not limited to a network topology with a single ring or only two intersecting points, and may be applied to all network topology situations.

15 Claims, 6 Drawing Sheets

(51) Int. Cl.
*H04L 12/46* (2006.01)
*H04L 12/437* (2006.01)
*H04L 12/26* (2006.01)
*H04L 12/751* (2013.01)

(56) References Cited

U.S. PATENT DOCUMENTS

2009/0037607 A1 2/2009 Farinacci et al.
2010/0020797 A1 1/2010 Casey et al.
2011/0243140 A1* 10/2011 Musku ............... H04L 45/00
370/395.53

FOREIGN PATENT DOCUMENTS

| CN | 101834770 A | 9/2010 |
| CN | 1018344770 A | 9/2010 |
| EP | 2124393 A1 | 5/2007 |
| WO | 2009018127 A1 | 2/2009 |
| WO | 2009146300 A1 | 12/2009 |

OTHER PUBLICATIONS

Chinese International Search Report, Application No. PCT/CN2011/078478, dated May 24, 2012, 10 pages.
Information technology—Telecommunications and information exchange between systems—Local and metropolitan area network—Common specifications, Part 3: Media Access Control (MAC) Bridges, ISO/IEC 15802-3: 1998, ANSI/IEEE Std 802.1D, 1998 Edition, Sponsor by LAN MAN Standards Committee of the IEEE Computer Society, 1998, 375 pages.
Huawei, Technical White Paper for Rapid Ring Protection Protocol (RRPP), http://datacomm.huawei.com, 2007, 14 pages.

* cited by examiner

PACKET PROCESSING METHOD AND SYSTEM

This application is a continuation of International Application No. PCT/CN2011/078478, filed on Aug. 16, 2011, which is hereby incorporated by reference in its entirety.

TECHNICAL FIELD

Embodiments of the present invention relate to the field of communications technologies, and in particular, to a packet processing method and system.

BACKGROUND

A layer 2 network loop brings many problems to a normal network, for example, a broadcast storm and a media access control (MAC) address learning error. A direct result of a broadcast storm is invalid occupation of a network bandwidth and a resource such as a central processing unit (CPU) and a memory of a network device. A direct result of a MAC address learning error is that a same MAC address flaps among multiple ports, leading to a forwarding error of layer 2 traffic. Therefore, a layer 2 loop prevention protocol is commonly used in a current metropolitan area network to protect a service. The so-called loop prevention indicates that a ring is changed to a link on a layer 2 Ethernet network to prevent a loop. Loop prevention protocols mostly used in current service protection include a rapid ring protection protocol (RRPP) and a spanning tree protocol (STP), where the STP is further classified into a multiple spanning tree protocol (MSTP) and a rapid spanning tree protocol (RSTP).

The RRPP is a link layer protocol specially applied to an Ethernet ring, and is capable of preventing a broadcast storm caused by a loop on the Ethernet ring. When a link on the Ethernet ring is disconnected, the RRPP is capable of rapidly starting a backup link to restore a communication path among nodes on the ring network. RRPP convergence time is irrelevant to the number of nodes on the ring network, a convergence speed is fast, and the RRPP convergence time is less than 50 ms. However, the RRPP applies only to a simple network topology, such as a single ring topology or an intersecting ring topology that has only two intersecting points, and does not apply to a relatively complex network topology.

The STP selectively blocks a redundant link on a network to achieve an objective of removing a network layer 2 loop, and meanwhile, has a link backup function. The RSTP introduces a port state negotiation mechanism, so that topology convergence time may be within 3 s. The MSTP has characteristics of both the STP and the RSTP, and can apply to all network topology situations. However, the topology convergence speeds of the RSTP and the MSTP are too slow. When the RSTP or the MSTP is used in the metropolitan area network to perform packet processing, packet processing interruption time is too long.

SUMMARY OF THE INVENTION

Embodiments of the present invention provide a packet processing method and system, which can be applicable to a complex network topology, and packet processing switching time is short, thereby reducing interruption time.

An embodiment of the present invention provides a packet processing method, including: sending, by a root node, a topology update packet to a transit node in an area; receiving a topology update response packet sent by the transit node in the area, where the topology update response packet carries node information of the transit node in the area; configuring a control virtual local area network VLAN for each ring in the area respectively according to the node information which is of the transit node in the area and is carried in the topology update response packet, where control VLANs of any two rings that have an adjacent edge in the area are different; sending, by the root node, a VLAN configuration packet to the transit node in the area, where the VLAN configuration packet carries configuration information used for configuring a control VLAN for each ring in the area respectively.

An embodiment of the present invention provides a packet processing system, including: a root node and a transit node in an area, where the root node is configured to send a topology update packet to the transit node in the area; the transit node in the area is configured to obtain a priority of a node according to the topology update packet, and send a topology update response packet to the root node, where the topology update response packet carries node information of the transit node; the root node is further configured to receive the topology update response packet, and configure a control virtual local area network VLAN for each of all rings in the area respectively according to the node information which is of the transit node in the area and is carried in the topology update response packet, where control VLANs of any two rings that have an adjacent edge in the area are different; and send a VLAN configuration packet to a node in the area, where the VLAN configuration packet carries configuration information used for configuring configuration information of a control VLAN for a ring in the area.

It can be known from the foregoing embodiments of the present invention that, because a root node configures different control VLANs for any two rings that have an adjacent edge in an area, different control VLANs are used to transmit a protocol packet in a ring that has its own control VLAN configured. The method and system may be applied to a ring network of a metro Ethernet to provide multi-path protection and implement rapid convergence of service switchover. In addition, a network topology structure is not limited to a network topology with a single ring or only two intersecting points, and may be applied to all network topology situations.

DETAILED DESCRIPTION OF ILLUSTRATIVE EMBODIMENTS

Embodiments of the present invention provide a packet processing method and system, which can be applicable to a complex network topology, and packet processing switching time is short, thereby reducing interruption time.

To make the objectives, features, and advantages of the present invention more clearly and comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person skilled in the art based on the embodiments of the present invention shall fall within the protection scope of the present invention.

Figure 1:
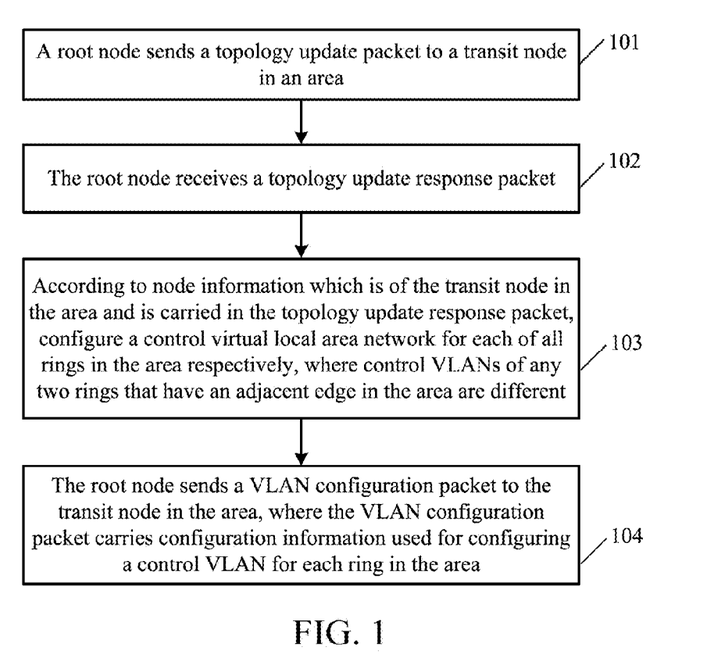
FIG. 1 is a schematic diagram of a packet processing method according to an embodiment of the present invention.

Referring to FIG. 1, FIG. 1 is a schematic diagram of a packet processing method according to an embodiment of the present invention. The method shown in FIG. 1 includes the following steps.

101: A root node sends a topology update packet to a transit node in an area.

In the embodiment of the present invention, processing on a packet is performed within an area; areas are distinguished by configuring a character string or an area identity (ID). An area may include one ring or more than one ring-shaped network (hereinafter referred to as ring). Each ring is formed by nodes and edges. A node may specifically be a root node, a backup root node, and a transit node, and an edge may specifically be a link connecting two adjacent nodes.

In the embodiment of the present invention, an area may have only one root node, one or more than one backup root node, and one or more than one transit node. After the root node is offline, a backup root node is configured to replace the root node to implement a function of the root node. When more than two backup root nodes are set in an area, a backup root node with a highest priority may be selected, according to priorities of the backup root nodes, to replace the root node to implement a function of the root node. After the root node is online, a topology update packet is still periodically sent by the root node to maintain ring state information of each ring in the area.

That a root node sends a topology update packet to a transit node in an area may be that the root node periodically sends the topology update packet to the transit node in the area and maintain ring state information of each ring in the area according to node information fed back by the transit node. In an actual application, a period in which the root node sends a topology update packet may specifically be set according to a network topology. For example, the period may be set to 15 s to 45 s. Preferably, the root node sends a topology update packet at a time interval of 45 s. Optionally, the topology update packet is a multicast packet sent by the root node, and in an actual application, may specifically be a bridge protocol data unit (BPDU) packet. Optionally, the topology update packet may carry a time to live (TTL) value, where the TTL value is the number of nodes that a specified data packet is allowed to pass before the data packet is discarded by a node. The TTL value is set by the root node to prevent a data packet from continuously looping on a network topology in the area. When a node forwards a data packet, the node needs to reduce the TTL value by 1 and then forwards the data packet.

For any ring in the area, any node of the ring is adjacent to only two nodes in this ring; any edge in the area belongs to two different rings at most, and a packet may be transmitted between any two nodes in the area. In an embodiment of the present invention, two nodes adjacent to each other may specifically be: two transit nodes adjacent to each other, one transit node and the root node adjacent to each other, one transit node and one backup root node adjacent to each other, two backup root nodes adjacent to each other, or one backup root node and the root node adjacent to each other.

Figure 2:
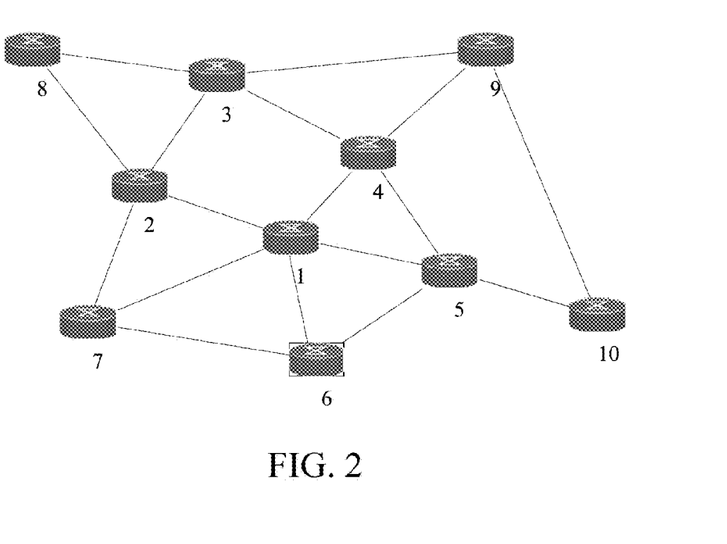
FIG. 2 is a schematic compositional diagram of all rings in an area according to an embodiment of the present invention.

Description is given in the following by taking figures as examples. As shown in FIG. 2, only a root node 4 is set in an area, and this area includes multiple rings. For example, a transit node 1, a transit node 6, and a transit node 7 form a ring 1; the transit node 1, a transit node 5, and the transit node 6 form a ring 2; an edge formed by the transit node 1 and the transit node 6 in the area only belongs to the ring 1 and the ring 2, and no longer belongs to any other ring except the two rings. A packet may be transmitted between the transit node 6 and a transit node 2 in the area. The transit node 6 and the transit node 1 form one edge; the transit node 1 and the transit node 2 form one edge. Similarly, a packet is transmitted between any two nodes in the area.

In an embodiment of the present invention, after the transit node receives the topology update packet sent by the root node, the transit node may obtain its own priority by analyzing the topology update packet. For example, that the transit node obtains its own priority may specifically be implemented in the following manner.

According to the TTL value carried in the topology update packet, the transit node calculates its own cost (Cost) value and obtains its own priority.

In the embodiment of the present invention, a Cost value of each transit node may be used to represent a priority of each transit node. For example, the smaller a Cost value of a transit node is, the higher a priority of the transit node is. In practice, a case that two transit nodes have a same Cost value may occurs. In this case, MAC addresses of the transit nodes may be further taken into consideration. A transit node with a smaller MAC address has a higher priority; and a transit node with a larger MAC address has a lower priority.

In the embodiment of the present invention, the root node may be selected according to an actual situation. Therefore, in order to ensure that the root node has a highest priority, a Cost value of the root node may be set to 0 and a Cost value of the transit node is calculated according to the following formula.

Cost value=(256−TTL value)×256−(metric value−1)

In the formula, the metric value is the number of edges that a transit node forms.

Figure 3:
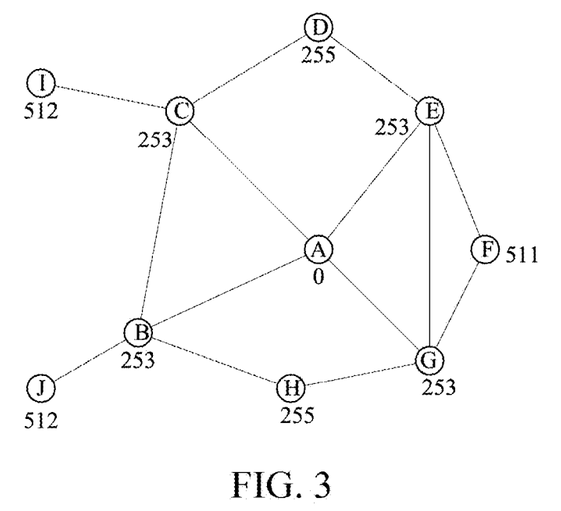
FIG. 3 is a schematic diagram of Cost values calculated for all rings in an area according to an embodiment of the present invention.

For example, in a scenario shown in FIG. 3, for a unique root node A in an area, a Cost value of the root node A may be set to 0; for a transit node G, because the transit node G forms four edges in total, its metric value is 4. Assume that a TTL value carried in a topology update packet received by the transit node G is 255. A Cost value of the transit node G=(256−TTL value)×256−(metric value−1)=(256−255)× 256−(4−1)=253. According to a same calculation manner, a Cost value of each transit node in the area shown in FIG. 3 may be obtained. As shown in FIG. 3, a value marked below each transit node is a Cost value of each transit node.

In the embodiment of the present invention, because a Cost value of a transit node is relevant to a TTL value carried in a received topology update packet, different topology update packets may lead to different Cost values calculated by the transit node. Optionally, when a second Cost value calculated by the transit node according to a latest received topology update packet (which may be referred to as a second topology update packet for distinguishing) is smaller than a first Cost value calculated according to an earlier received topology update packet (which may be referred to as a first topology update packet), the transit node updates its own Cost value according to the second Cost value, reduces a TTL value in the second topology update packet by 1 and then forwards the second topology update packet. Reversely, when the second Cost value calculated by the transit node according to the second topology update packet is larger than the first Cost value calculated according to the first topology update packet, the transit node may not perform any processing on the second topology update packet, and preferably, may discard the second topology update packet.

Optionally, in the embodiment of the present invention, each node may further set aging time for a Cost value. For example, it may be set that the aging time is 2 minutes. To maintain stability of the network topology, an aged Cost value is still valid. However, in a case that the Cost value is aged, when a node receives a topology update packet, even if a calculated Cost value is larger than an earlier calculated Cost value, the node also updates the Cost value, reduces a TTL value of the topology update packet by 1 and then forwards the topology update packet.

After the transit node reduces the TTL value of the topology update packet by 1 and then forwards the topology update packet, the transit node sends a topology update response packet to the root node, where the topology update response packet carries node information of the transit node. For example, the topology update response packet may carry node information of the transit node, such as a Cost value and a MAC address of the transit node, a MAC address of an adjacent node that is on a same ring as the transit node, and an identity (ID) of a ring where the transit node is located. Optionally, the topology update response packet sent by the transit node may specifically be a unicast packet.

Optionally, in the embodiment of the present invention, the root node may further send a topology update packet to a backup root node in the area. After the backup root node receives the topology update packet, the backup root node does not modify a TTL value in the topology update packet, and directly forwards the topology update packet. Then, the backup root node sends a topology update response packet to the root node, where the topology update response packet carries node information of the backup root node. For example, the topology update response packet may carry node information, such as a Cost value and a MAC address of the backup root node, a MAC address of an adjacent node that is on a same ring as the backup root node, and an ID of a ring where the backup root node is located. Optionally, the topology update response packet sent by the transit node may specifically be a unicast packet.

In the embodiment of the present invention, because it is ring-shaped networking, the root node may also receive a topology update packet. Optionally, after receiving the topology update packet, the root node discards the topology update packet.

102: The root node receives the topology update response packet, where the topology update response packet carries node information of the transit node in the area.

103: According to the node information which is of the transit node in the area and is carried in the topology update response packet, configure a control virtual local area network (VLAN) for each of all rings in the area respectively, where control VLANs of any two rings that have an adjacent edge in the area are different.

In the embodiment of the present invention, according to the node information carried in the topology update response packet, the root node may know how many rings are in the area, and configure a control VLAN for each of all the rings in the area respectively. A principle is that VLANs configured for any two rings that have an adjacent edge in an area are different.

Optionally, in an actual application, it may be implemented by using the four color theorem (that is, any map can have all areas on it distinguished by using only four colors). That is, the root node may use four different control VLANs to have all rings in one area distinguished, and control VLANs of any two rings that have an adjacent edge in the area are different.

For example, a VLAN1, a VLAN2, a VLAN3, and a VLAN4 (equivalent to four different colors: red, blue, yellow, and green) may be used to distinguish all the rings in the area. It should be noted that, the VLAN1, the VLAN2, the VLAN3, and the VLAN4 are only symbols of control VLANs to represent different control VLANs, but are not specific control VLAN identities, and are only used for description. A specific control VLAN identity needs to be configured according to a specific application scenario.

Figure 4:
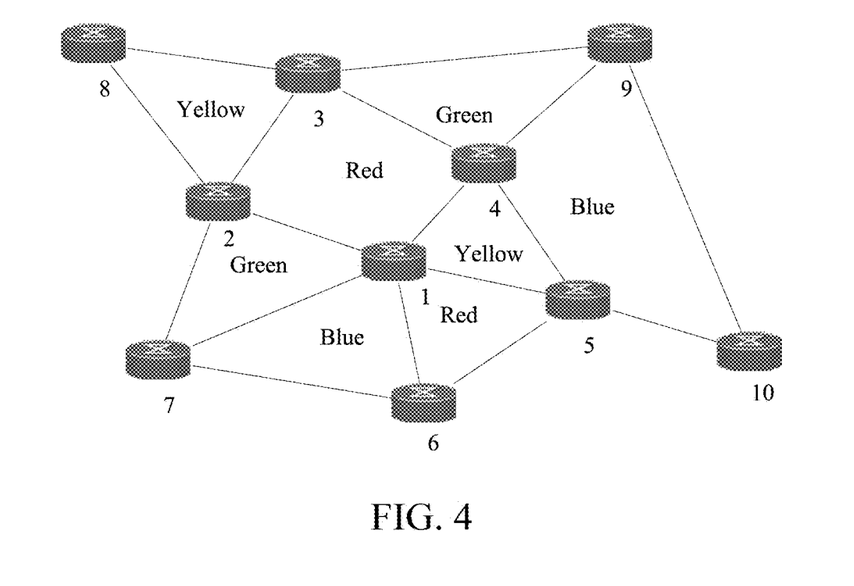
FIG. 4 is a schematic diagram about coloring all rings in an area according to an embodiment of the present invention.

Take a scenario shown in FIG. 4 as an example. A ring formed by a transit node 1, a transit node 6, and a transit node 7 is represented by blue, indicating that a VLAN2 is configured for this ring. A ring formed by the transit node 1, a transit node 5, and the transit node 6 is represented by red, indicating that a VLAN1 is configured for this ring. In an area shown in FIG. 4, colors of two rings that have an adjacent edge are different, indicating that control VLANs configured for the two rings are different.

Of course, it may be understood that, if the number of rings in the area is not so large, for example, only two or three, only two or three control VLANs need to be used to distinguish all the rings in the area, and control VLANs of any two rings that have an adjacent edge in the area are different.

104: The root node sends a VLAN configuration packet to the transit node in the area, where the VLAN configuration packet carries configuration information used for configuring a control VLAN for each ring in the area.

Optionally, in the embodiment of the present invention, the root node may also send a VLAN configuration packet to a backup root node in the area.

Optionally, after the root node sends the VLAN configuration packet to the transit node in the area (namely, the operation 104), the method in the embodiment of the present invention may further include a master node that sends, through a master port, a ring state periodic detection packet to all nodes in a ring where the master node is located, to detect whether links of the ring where the master node is located are complete. The master node is a transit node with a lowest priority in the ring where the master node is located; the master node connects, through two ports, to two adjacent nodes in the ring where the master node is located, where a port connects to an adjacent node with a lower priority is a blocked port and the other port is a master port.

It should be noted that, in the embodiment of the present invention, the master node is a type of transit node, and when not specifically pointed out, there is no need to distinguish a transit node from a master node.

After the master node sends, through the master port, the ring state periodic detection packet to all the nodes in the ring where the master node is located, the embodiment of the present invention may further include: If the master node can receive the ring state periodic detection packet through the blocked port, the master node determines that the links of the ring are complete in this case. If the master node does not receive the ring state periodic detection packet through the blocked port, the master node determines that the links of the ring are incomplete in this case.

Take a scenario shown in FIG. 3 as an example. In a ring formed by a transit node A, a transit node G, a transit node H, and a transit node B, the transit node H has a largest Cost value. Therefore, the transit node H is a master node in the ring. When multiple transit nodes that have a same largest Cost value exist on the ring, the master node is a transit node with a largest MAC address.

Figure 5:
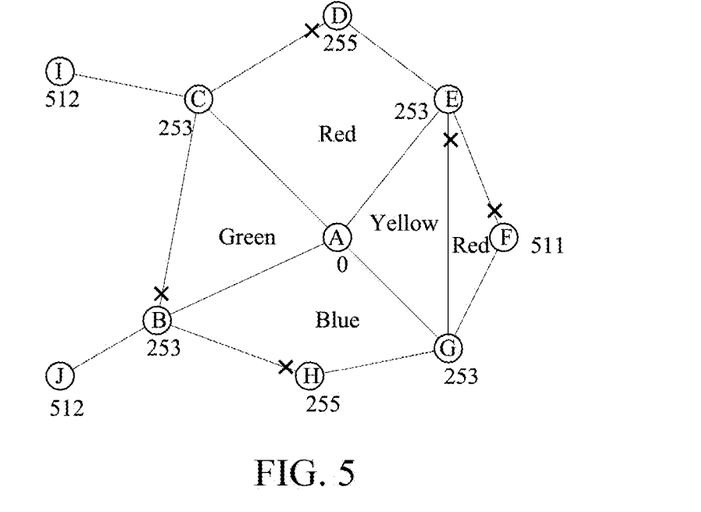
FIG. 5 is a schematic diagram about setting master nodes and blocked ports for all rings in an area according to an embodiment of the present invention.

Again, take a scenario shown in FIG. 5 as an example. In a blue ring formed by a transit node A, a transit node G, a transit node H, and a transit node B, a master node H has two ports, which connect to the transit node B and the transit node G respectively. Compare priorities of the transit node B and the transit node G. Because Cost values of the transit node B and the transit node G are both 253, MAC addresses of the two nodes are further compared. Assume that a MAC address of the transit node B is larger than a MAC address of the transit node G, a priority of the transit node B is lower than that of the transit node G; therefore, on the master node H, a port connecting to the transit node B is a blocked port. In FIG. 5, "x" is used to represent the blocked port. In a similar manner, a master node and a blocked port are set for all rings in the area shown in FIG. 5.

Optionally, when the master node determines that the links in the ring where the master node is located is incomplete, the method in the embodiment of the present invention may further include: The master node unblocks a blocked port of the master node, and respectively sends, through the master port and the blocked port, a ring state failure notification packet to each of all the nodes in the ring where the master node is located, to instruct each transit node in the ring to clear records in a MAC address forwarding table and records in an address resolution protocol (ARP) address forwarding table of each transit node.

If the master node detects that the links in the ring where the master node is located is restored to completeness, the method in the embodiment of the present invention may further include: The master node blocks the blocked port of the master node, and sends, through the master port, a ring state complete notification packet to all the nodes in the ring where the master node is located, to instruct each transit node in the ring to clear records in the MAC address forwarding table and records in the ARP address forwarding table of each transit node.

Optionally, after the root node sends the VLAN configuration packet to the transit node in the area (the operation 104), the method in the embodiment of the present invention may further include: A first node sends a ring topology information exchange packet to another node that belongs to a same ring as the first node, to implement exchange of node information among nodes in the same ring. Description in the operation 103 may be referred to for description of node information, and details are not repeatedly described herein. The first node is a certain node in a certain ring, which may be a transit node, or a backup root node, or a root node.

In an embodiment of the present invention, in a same ring, all nodes each include only two ports, and what state each port is in is referred to as a port state machine. A port state machine of a root node and a backup root node in an area and transit nodes in all rings may be classified into the following four situations. To clearly describe a conversion relationship among the four port state machines, reference may be made to FIG. 6. Detailed description is as follows.

Figure 6:
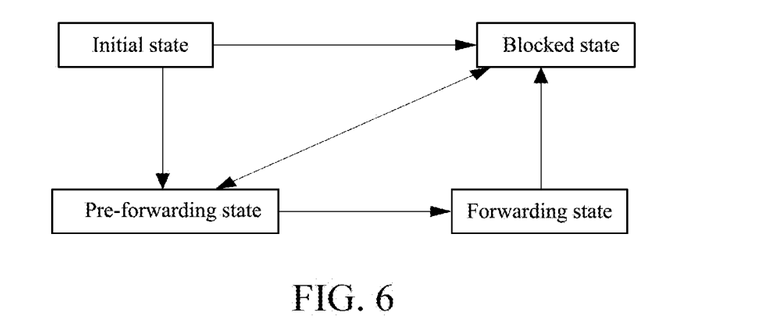
FIG. 6 is a schematic diagram of a port state of a root node, a transit node, and a backup root node in an area according to an embodiment of the present invention.

Initial state: When no control VLAN is configured for each ring, a state of each port is an Initial state. Under the Initial state, a protocol packet can be processed, but a data packet cannot be forwarded.

Pre-forwarding state: When each port converts from the Initial state or a Blocked state into a Forwarding state, a Pre-forwarding needs to be passed. A timeout period needs to be set for the Pre-forwarding state. If a ring state complete notification packet cannot be received within the timeout period, the port mandatorily converts into the Forwarding state. Under the Pre-forwarding state, a protocol packet can be processed, but a data packet cannot be forwarded.

Forwarding state: In case that a topology is stable, a port of another transit node except a master node in each ring and a master port of the master node in each ring have to reach the Forwarding state. Under the Forwarding state, a data packet may be normally received and sent, and a protocol packet may be processed.

Blocked state: In case that a topology is stable, a blocked port of a master node has to reach the Blocked state. When a fault occurs on a link connected to the port, a port of another transit node except the master node in each ring is in the Blocked state. Under the Blocked state, the port can only process a protocol packet, but cannot receive or send a data packet. Under the Blocked state, the port may still normally forward and process a protocol packet of a non-local ring.

Optionally, after the VLAN configuration packet is sent to the transit node in the area (104), the method in the embodiment of the present invention may further include: When a fault occurs on an adjacent edge of any two rings in the area, a master node of a ring with a higher priority in the two rings unblocks a blocked port of the master node. If the two rings have a same priority, a master node of a ring with a smaller identity ID in the two rings unblocks a blocked port of the master node, where a priority of a ring is an average value of priorities of nodes in the ring.

In the network topology of the embodiment of the present invention, any edge belongs to two rings at most. When a fault occurs on an adjacent edge of two rings, a master node in only one ring unblocks a blocked port. If master nodes of the two rings unblock blocked ports simultaneously, a new loop may occur. Therefore, when a fault occurs on an adjacent edge of two rings, a master node in a ring with a higher priority unblocks a blocked port of the master node.

A priority of the ring may be obtained by using a Cost value of each node in the ring. For example, a Cost value of a ring=an average value of Cost values of nodes in the ring, where the larger the Cost value of the ring is, the lower the priority of the ring is. If Cost values of two rings are the same, the smaller a ring ID is, the higher a priority is. Reversely, the larger the ring ID is, the lower the priority is.

Figure 7:
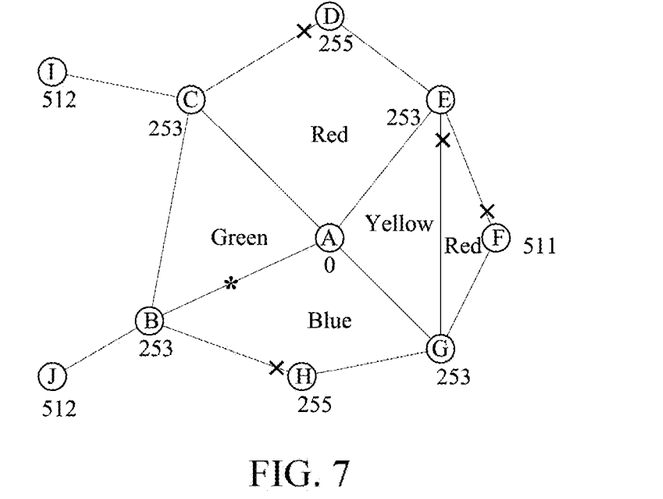
FIG. 7 is a schematic diagram of a fault occurring on an AB edge in an area according to an embodiment of the present invention.

For example, as shown in FIG. 7, when a fault occurs on an adjacent edge AB of two rings in an area, represented by "*" in FIG. 7, by calculating priorities of the two rings, a blocked port of a master node B in a green ring with a lower priority is selected to be unblocked, and a blocked port of a master node H in a blue ring still remains blocked. In this case, after a ring periodic detection packet in the blue ring reaches a transit node A, the ring periodic detection packet is forwarded to a transit node B through a transit node C. Link state detection of the blue ring can still be normally performed, as shown in FIG. 8.

Figure 8:
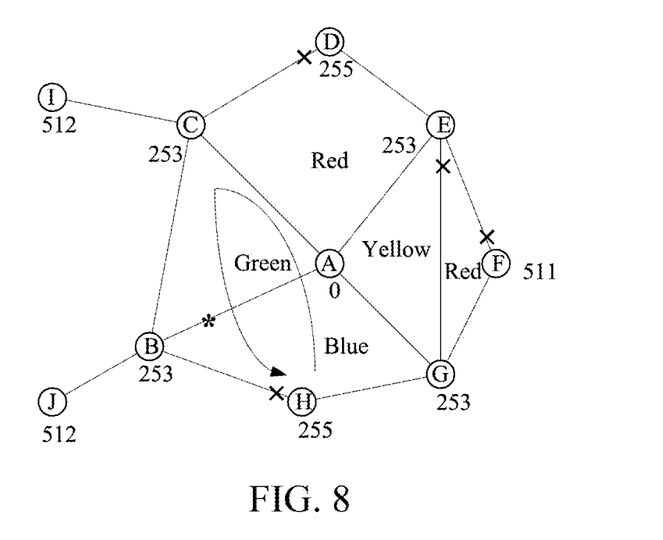
FIG. 8 is a schematic diagram about unblocking a blocked port when a fault occurring on an AB edge in an area according to an embodiment of the present invention.
Figure 9:
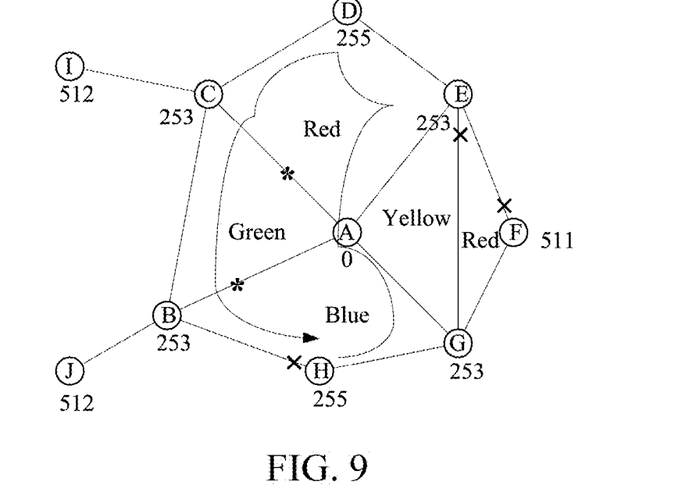
FIG. 9 is a schematic diagram about unblocking a blocked port when faults occurring on an AB edge and an AC edge in an area according to an embodiment of the present invention.

In another example, in FIG. 8, after a green ring is unblocked, if a fault occurs on an edge AC in this case, as shown in FIG. 9, represented by "*" in FIG. 9, by calculating a red ring and the green ring where the adjacent edge AC is located, a blocked port of a master node D in the red ring with a lower priority is selected to be unblocked, and a ring periodic detection packet in a blue ring can still be normally forwarded through a path AEDCB.

To ensure that a ring periodic detection packet in the blue ring as shown in the foregoing FIG. 9 can be normally forwarded in the green ring and the red ring, when a fault occurs on AB and AC links, a corresponding forwarding rule needs to be delivered at transit nodes that form the AB and the AC, including a transit node A, a transit node B, and the transit node A, a transit node C. Generally, VLAN mapping or VLAN stacking may be used for this processing. Take VLAN mapping as an example. When a fault occurs on an AB edge, the transit node A delivers a VLAN mapping rule: mapping a VLAN3 to a VLAN2 of a packet. Because in the foregoing description, red represents a VLAN1, green represents the VLAN2, blue represents the VLAN3, and yellow represents a VLAN4, a VLAN configured for the ring periodic detection packet in the blue ring is the VLAN3. To map a ring periodic detection packet of the transit node A to the green ring (a VLAN configuration is the VLAN2), the VLAN3 needs to be mapped to the VLAN2. That is, a ring periodic detection packet carrying a VLAN3 in the blue ring converts into a ring periodic detection packet carrying a VLAN2 after passing the node A, represented by "3→2" for simplicity. The transit node B delivers a VLAN mapping rule: "2→3". When a fault occurs on an AC edge, the transit node A delivers a VLAN mapping rule: "3→1", and the transit node C delivers a VLAN mapping rule: "1→3". When a fault occurs on both the AB edge and the AC edge, the node A delivers a final VLAN mapping rule: "3→1". When the AB edge and the AC edge restore from the fault, the transit node A, the transit node B, and the transit node C delete the VLAN mapping rules delivered during the edge fault. Take VLAN stacking as an example. When a fault occurs on an AB edge, the transit node A delivers a VLAN mapping rule: mapping a VLAN3 to a VLAN2 of a packet. Because in the foregoing description, red represents a VLAN1, green represents the VLAN2, blue represents the VLAN3, and yellow represents a VLAN4, a VLAN configured for the ring periodic detection packet in the blue ring is the VLAN3. To map a ring periodic detection packet of the transit node A to the green ring (a VLAN configuration is the VLAN2), the VLAN2 needs to be overlapped on the packet of the VLAN3. That is, a ring periodic detection packet carrying a VLAN3 in the blue ring converts into a ring periodic detection packet carrying two VLANs (which are the VLAN2 and the VLAN3) after passing the node A. When the ring periodic detection packet leaves the green ring, the overlapped VLAN2 is removed from the ring periodic detection packet, and only the carried VLAN3 remains.

In the embodiment of the present invention, the foregoing method further includes: The root node deploys a bidirectional link detection protocol on a link, or a blocked port of each master node performs an acknowledgement reply after receiving the ring periodic detection packet. Detection is normal only after the master port of the master node receives an acknowledgement reply packet from the blocked port. If no packet is received within several consecutive periods, it may be regarded that a link fault occurs, so as to further solve a case that a unidirectional link fault may exist in an actual network. In an actual application, after a unidirectional link fault occurs, the following two aspects of influence are caused.

In a first aspect, a link in a direction for sending a ring periodic detection packet is faulty, but a link of the other direction is normal. In this situation, a blocked port is unblocked, which causes a unidirectional loop. For example, taking FIG. 7 as an example, in a red ring formed by a transit node E, a transit node F, and a transit node G, links of two directions exist on the one edge EG, such as a link from E to G and a link from G to E. For example, the link from E to G is the direction for sending a ring periodic detection packet. When a fault occurs on the link from E to G and the link from G to E is normal, because of the fault on the link from E to G in this case, a master node F of the ring unblocks the blocked port. In this case, a unidirectional loop occurs on the link from G to E.

In a second aspect, a link in a direction for sending a ring periodic detection packet is normal, but a link of the other direction is faulty. In this situation, a part of services are interrupted. For example, taking FIG. 7 as an example, in a red ring formed by the transit node E, the transit node F, and the transit node G, links of two directions exist on the one edge EG, such as a link from E to G and a link from G to E. For example, the link from E to G is the direction for sending a ring periodic detection packet. When the link from E to G is normal and a fault occurs on the link from G to E, because the link from E to G is normal, a master node F of the ring does not unblock the blocked port. However, a part of services are interrupted because the link from G to E is faulty.

In the embodiment of the present invention, after the root node sends the VLAN configuration packet to the transit node in the area (the operation 104), the method in the embodiment of the present invention may further include: When a ring whose network topology changes exists in the area, the root node reconfigures a control VLAN for the ring whose network topology changes in the area; the root node sends a VLAN alternation packet to a node in the area, where the VLAN alternation packet carries configuration information used for reconfiguring a control VLAN for the ring whose network topology changes in the area.

Figure 10:
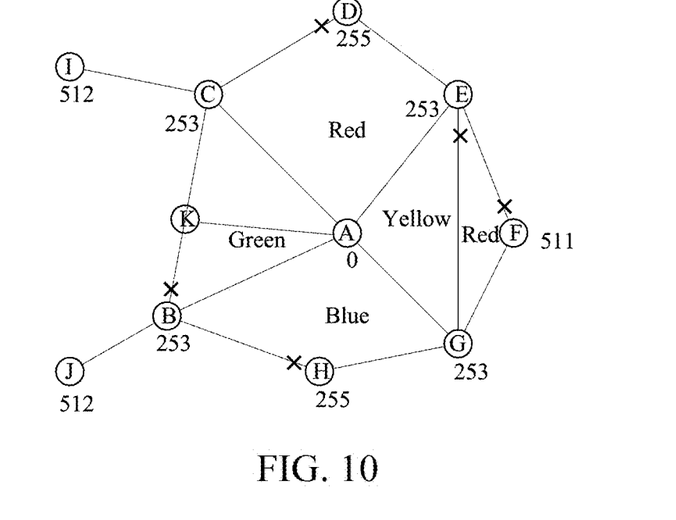
FIG. 10 is a schematic diagram about newly adding a transit node to an area according to an embodiment of the present invention.
Figure 11:
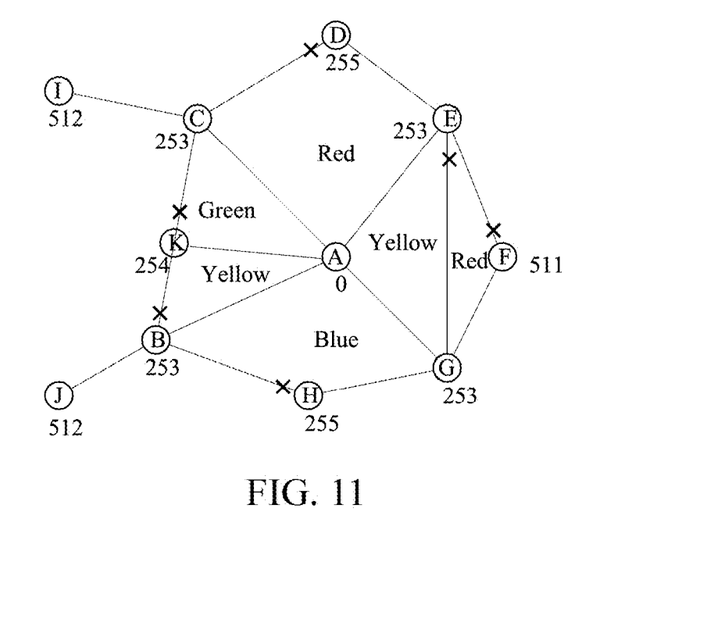
FIG. 11 is a schematic diagram about configuring a master node and a blocked port for a ring formed by a newly added transit node in an area according to an embodiment of the present invention.

For example, as shown in FIG. 10, after a node K is newly added between B and C, the original ring ACB is divided into two rings ACK and AKB. In this case, IDs of the two rings ACK and AKB need to be reconfigured. The root node reconfigures control VLANs for the two rings, and then, each of the two rings re-select a master node respectively. As shown in FIG. 11, a master node needs to re-selected for each of the ring ACK and the ring AKB respectively.

According to the method described in the foregoing embodiment of the present invention, the transit node B is selected as a master node of the ring AKB and the blocked port is represented by "x" in the figure; a transit node K is a master node of the ring ACK and the blocked port is represented by "x" in the figure.

It should be noted that, in FIG. 11, when a master node changes, a processing manner for a master node alternation is as follows: After a topology changes, a master node alternation of a certain ring may be affected. During a process of the master node alternation, in order to avoid service interruption, first, select a new master node, and then, set a port state machine of a blocked port of an original master node to the Pre-forwarding state, and then, a new master node completes port blocking and sends a ring state complete notification packet to notify that all ports are set to the Forwarding state. A processing manner for a ring VLAN alternation is as follows: After a network topology changes and the root node reconfigures a control VLAN, a control VLAN alternation processing needs to be performed on a ring whose network topology changes in the entire area. To ensure that an original service is not affected in this case, during a control VLAN alternation process, a state in the ring no longer changes until a new control VLAN alternation is complete, and then, a master node alternation operation is reperformed.

It can be known from the foregoing embodiments of the present invention that, because a root node configures different VLANs for any two rings that have an adjacent edge in an area, the control VLANs are used to transmit a protocol packet in a ring that has its own control VLAN configured. The method and system may be applied to a ring network of a metro Ethernet to provide multi-path protection and implement rapid convergence of service switchover. In addition, a network topology structure is not limited to a network topology with a single ring or only two intersecting points, and may be applied to all network topology situations.

The foregoing embodiments introduce the packet processing method provided by the embodiments of the present invention. The following introduces a system using the packet processing method provided by an embodiment of the present invention.

Figure 12:
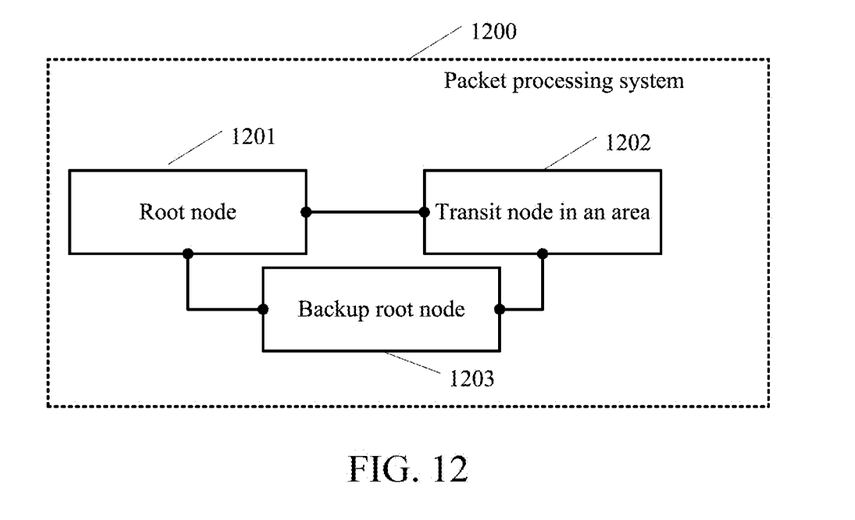
FIG. 12 is a schematic diagram of a packet processing system according to an embodiment of the present invention.

As shown in FIG. 12, an embodiment of the present invention provides a packet processing system 1200. The system includes a root node 1201 and a transit node 1202 in an area, where the root node 1201 is configured to send a topology update packet to the transit node in the area. The transit node 1202 in the area is configured to obtain a priority of a node according to the topology update packet, and send a topology update response packet to the root node 1201, where the topology update response packet carries node information of the transit node. The root node 1201 is further configured to receive the topology update response packet, and configure a control virtual local area network VLAN for each of all rings in the area respectively according to the node information which is of the transit node in the area and is carried in the topology update response packet, where control VLANs of any two rings that have an adjacent edge in the area are different, and send a VLAN configuration packet to a node in the area, where the VLAN configuration packet carries configuration information used for configuring configuration information of a control VLAN for a ring in the area.

Optionally, the system may further include a backup root node 1203, where the root node 1201 is further configured to send a topology update packet to the backup root node 1203 in the area.

Optionally, when the transit node 1202 in the area is a master node, the transit node 1202 in the area is further configured to send, through a master port, a ring state periodic detection packet to all nodes in a ring where the transit node 1202 in the area is located.

Optionally, when the transit node 1202 in the area is a master node, the transit node 1202 in the area is further configured to, when the master node detects, by using the ring state periodic detection packet, that links in a ring where the master node is located is incomplete, unblock a blocked port of the master node, and respectively send, through the master port and blocked port, a ring state failure notification packet to each of all nodes in the ring where the transit node 1202 in the area is located.

Optionally, when the transit node 1202 in the area is a master node, the transit node 1202 in the area is further configured to, when the master node detects that the links in the ring where the master node is located is restored to completeness, block the blocked port of the master node, and send a ring state complete notification packet to all nodes in the ring where the master node is located.

It should be noted that, content about information exchange and execution processes between nodes in the system is based on a same concept as those in the method embodiments of the present invention. Technical effects brought by the system are the same as those of the method embodiments of the present invention. For detailed content, reference may be made to description in the method embodiments of the present invention, and details are not repeatedly described herein.

It can be known from the foregoing embodiments of the present invention that, because a root node configures different control VLANs for any two rings that have an adjacent edge in an area, different control VLANs are used to transmit a protocol packet in a ring that has its own control VLAN configured. The method and system may be applied to a ring network of a metro Ethernet to provide multi-path protection and implement rapid convergence of service switchover. In addition, a network topology structure is not limited to a network topology with a single ring or only two intersecting points, and may be applied to all network topology situations.

A person of ordinary skill in the art may understand that all or part of the steps of the method according to the foregoing embodiments may be implemented by a program instructing relevant hardware. The program may be stored in a computer readable storage medium. The storage medium may be a read-only memory, a magnetic disk, or an optical disk, or the like.

The foregoing describes the packet processing method and system provided in the present invention in detail. A person of ordinary skill in the art may make variations to specific implementation manners and application scope according to the ideas of the embodiments of the present invention. Therefore, content of the specification shall not be construed as a limitation to the present invention.

What is claimed is:

1. A packet processing method comprising:
sending, by a root node, a topology update packet to a transit node in an area;
receiving a topology update response packet sent by the transit node in the area, wherein the topology update response packet carries node information of the transit node in the area;
configuring a control virtual local area network (VLAN) for each ring in the area respectively according to the node information of the transit node in the area and is carried in the topology update response packet, wherein control VLANs of any two rings that have an adjacent edge in the area are different; and
sending, by the root node, a VLAN configuration packet to the transit node in the area, wherein the VLAN configuration packet carries configuration information used for configuring a control VLAN for each ring in the area respectively.

2. The packet processing method according to claim 1, wherein the node information comprises:
a cost value of the transit node in the area, a media access control (MAC) address of the transit node in the area, a MAC address of an adjacent node that is on a same ring as the transit node in the area, and an identity ID of a ring where the transit node in the area is located.

3. The packet processing method according to claim 1, wherein after the sending, by the root node, a VLAN configuration packet to the transit node in the area, the method further comprises:
sending, by a master node and through a master port, a ring state periodic detection packet to all nodes in a ring where the master node is located.

4. The packet processing method according to claim 3, wherein after the sending, by a master node and through a master port, a ring state periodic detection packet to all nodes in a ring where the master node is located, the method further comprises:
determining whether the master node receives the ring state periodic detection packet through a blocked port;
if the master node receives the ring state periodic detection packet through a blocked port, determining, by the master node, that links of the ring are complete in this case; and
if the master node does not receive the ring state periodic detection packet through the blocked port, determining, by the master node, that the links of the ring are incomplete in this case.

5. The packet processing method according to claim 4, wherein when the master node determines that the links of the ring where the master node is located are incomplete, the method further comprises:
unblocking, by the master node, a blocked port of the master node, and respectively sending, through the master port and the blocked port, a ring state failure notification packet to each of all the nodes in the ring where the master node is located, to instruct each transit node in the ring to clear records in a MAC address forwarding table and records in an address resolution protocol (ARP) address forwarding table of each transit node.

6. The packet processing method according to claim 5, wherein when the master node detects that the links of the ring where the master node is located are restored to completeness, the method further comprises:
blocking, by the master node, the blocked port of the master node, and sending, through the master port, a ring state complete notification packet to all the nodes in the ring where the master node is located, to instruct each transit node in the ring to clear records in the MAC address forwarding table and records in the ARP address forwarding table of each transit node.

7. The packet processing method according to claim 1, wherein after the sending, by the root node, a VLAN configuration packet to the transit node in the area, the method further comprises:
exchanging, by the transit node in the area, the node information with another node in a same ring through a ring topology information exchange packet.

8. The packet processing method according to claim 1, wherein after the root node sends the VLAN configuration packet to the transit node in the area, and when a fault occurs on an adjacent edge of any two rings in the area, a master node of a ring with a higher priority in the two rings unblocks a blocked port of the master node, wherein if the two rings have a same priority, a master node of a ring with a smaller identity ID in the two rings unblocks the blocked port of the master node.

9. The packet processing method according to claim 8, wherein when a fault occurs on an adjacent edge of any two rings in the area, a forwarding rule is delivered at transit nodes that form the edge on which the fault occurs, and the forwarding rule comprises VLAN mapping or VLAN stacking.

10. The packet processing method according to claim 1, wherein after the sending, by the root node, a VLAN configuration packet to the transit node in the area, the method further comprises:
when a ring whose network topology changes exists in the area, reconfiguring, by the root node, a control VLAN for the ring whose network topology changes in the area, and sending a VLAN alternation packet to the transit node in the area, wherein the VLAN alternation packet carries configuration information used for reconfiguring a control VLAN for the ring whose network topology changes in the area.

11. A packet processing system, comprising a root node and a transit node in an area, wherein,
the root node is configured to send a topology update packet to the transit node in the area;
the transit node in the area is configured to obtain a priority of a node according to the topology update packet, and send a topology update response packet to the root node, wherein the topology update response packet carries node information of the transit node; and
the root node is further configured to receive the topology update response packet, and configure a control virtual local area network VLAN for each of all rings in the area respectively according to the node information which is of the transit node in the area and is carried in the topology update response packet, wherein control VLANs of any two rings that have an adjacent edge in the area are different, and send a VLAN configuration packet to a node in the area, and wherein the VLAN configuration packet carries configuration information used for configuring configuration information of a control VLAN for a ring in the area.

12. The packet processing system according to claim 11, wherein when the transit node in the area is a master node, the transit node in the area is further configured to send, through a master port, a ring state periodic detection packet to all nodes in a ring where the transit node in the area is located.

13. The packet processing system according to claim 11, wherein when the transit node in the area is a master node, the transit node in the area is further configured to, when the master node detects, by using a ring state periodic detection packet, that links in a ring where the master node is located are incomplete, unblock a blocked port of the master node, and respectively send, through a master port and the blocked port, a ring state failure notification packet to each of all nodes in the ring where the transit node in the area is located.

14. The packet processing system according to claim 13, wherein when the master node detects that the links in the ring where the master node is located are restored to completeness, the transit node in the area is further configured to block the blocked port of the master node, and send a ring state complete notification packet to all the nodes in the ring where the master node is located.

15. The packet processing system according to claim 11, further comprising a backup root node in the area, wherein the root node is further configured to send a topology update packet to the backup root node in the area.

* * * * *